(12) United States Patent  (10) Patent No.: US 11,587,005 B2
Kuwamura et al.  (45) Date of Patent: Feb. 21, 2023

(54) INSPECTION SUPPORT SYSTEM

(71) Applicant: KABUSHIKI KAISHA TOSHIBA, Minato-ku (JP)

(72) Inventors: Otoharu Kuwamura, Yokohama (JP); Keisuke Nishimura, Fujisawa (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/710,015

(22) Filed: Dec. 11, 2019

(65) Prior Publication Data

US 2020/0193349 A1   Jun. 18, 2020

(30) Foreign Application Priority Data

Dec. 12, 2018 (JP) .............................. JP2018-232682

(51) Int. Cl.
*G06Q 10/06* (2012.01)
*G06Q 10/00* (2012.01)
(Continued)

(52) U.S. Cl.
CPC ....... *G06Q 10/06316* (2013.01); *G06F 3/167* (2013.01); *G06Q 10/20* (2013.01);
(Continued)

(58) Field of Classification Search
CPC combination set(s) only.
See application file for complete search history.

(56) References Cited

U.S. PATENT DOCUMENTS 9,709,973 B2 * 7/2017 Toepke ............ G06Q 10/06315
2006/0010152 A1 * 1/2006 Catalano ................ G06Q 10/06
707/999.102

(Continued)

FOREIGN PATENT DOCUMENTS

CA   2775688 A1 * 11/2013 ....... G06Q 10/06311
CN   107004165 A * 8/2017 ............... G06F 3/14
(Continued)

OTHER PUBLICATIONS

Chen et al., "Nuclear Power Plant Device Maintenance Information Of The Application Management System And Application Method Thereof", 2015, Chinese Patent Application CN 104636868 A—Machine Translation (Year: 2015).*

(Continued)

*Primary Examiner* — Crystol Stewart
(74) *Attorney, Agent, or Firm* — Oblon, McClelland, Maier & Neustadt, L.L.P.

(57) ABSTRACT

According to one embodiment, an inspection support system includes a terminal device, a memory device, and a processing device. The terminal device is auxiliary to a worker inspecting an equipment, and is configured to input and output information. The memory device stores a main scenario of inspection work. The main scenario includes a plurality of block scenarios. The plurality of block scenarios each includes preparation procedure content, inspection item content, and restoration procedure content. The processing device refers to the memory device and transmits instruction information to the terminal device. The instruction information corresponds to at least one of the preparation procedure content, the inspection item content, or the restoration procedure content. The terminal device outputs the instruction information transmitted from the processing device and transmits response information to the processing device. The processing device transmits other instruction information to the terminal device.

7 Claims, 9 Drawing Sheets

(51) Int. Cl.
  *G10L 15/22* (2006.01)
  *H04N 1/00* (2006.01)
  *G10L 17/22* (2013.01)
  *G10L 15/16* (2006.01)
  *G06F 3/16* (2006.01)
  *G06Q 10/0631* (2023.01)
  *G06Q 10/20* (2023.01)

(52) U.S. Cl.
  CPC .............. *G10L 15/16* (2013.01); *G10L 15/22* (2013.01); *G10L 17/22* (2013.01); *H04N 1/00344* (2013.01)

(56) References Cited

U.S. PATENT DOCUMENTS

| | | | |
|---|---|---|---|
| 2007/0100583 A1 | 5/2007 | Yano et al. | |
| 2007/0129914 A1 | 6/2007 | Yano et al. | |
| 2008/0172268 A1* | 7/2008 | Wingenter | G06Q 10/20 705/305 |
| 2010/0100259 A1* | 4/2010 | Geiter | G06N 5/045 701/3 |
| 2010/0103270 A1* | 4/2010 | Pol | G06Q 10/20 709/225 |
| 2014/0207514 A1* | 7/2014 | Domke | G06Q 10/06316 705/7.26 |
| 2016/0042735 A1* | 2/2016 | Vibbert | G10L 15/222 704/257 |
| 2017/0039574 A1* | 2/2017 | Koerber | G06Q 10/20 |
| 2017/0091634 A1* | 3/2017 | Ritter | G05B 23/0262 |
| 2020/0035237 A1* | 1/2020 | Kim | G10L 15/22 |
| 2020/0075027 A1* | 3/2020 | Arantes | G06Q 10/063 |
| 2020/0160399 A1* | 5/2020 | Rakshit | G10L 15/26 |

FOREIGN PATENT DOCUMENTS

| | | |
|---|---|---|
| JP | 2002-189513 A | 7/2002 |
| JP | 2006-133928 A | 5/2006 |
| JP | 2013-29881 A | 2/2013 |

OTHER PUBLICATIONS

Kengo et al., "Inspection Assistance Device, Inspection Assistance System, Method of Assisting Inspection, and Inspection Assistance Program", 2011, International Intellectual Property Organization Publication No. WO 2012046726 A1—Machine Translation (Year: 2011).*

* cited by examiner

CONTENT LIST

| ID | INSPECTION LOCATION GROUP | INTERVAL | WORK CLASSI-FICATION | PRI-ORITY | NAME |
|---|---|---|---|---|---|
| 100000 | CONTROL PANEL | EACH TIME | PREPARE | 2 | CONTROL PANEL PREPARATION |
| 100101 | CONTROL PANEL | EACH TIME | CHECK | 2 | STARTUP COUNT CHECK |
| 100102 | CONTROL PANEL | EACH TIME | CLEAN | 1 | CONTROL PANE CLEANINGL |
| 100103 | CONTROL PANEL | 3M | MEASURE | 2 | DRIVING VOLTAGE MEASUREMENT |
| 100104 | CONTROL PANEL | 3M | MEASURE | 2 | CONTROL VOLTAGE MEASUREMENT |
| 100900 | CONTROL PANEL | EACH TIME | RESTORE | 2 | CONTROL PANEL RESTORATION |
| ⋮ | | | | | |
| 200000 | ELECTRIC MOTOR | EACH TIME | PREPARE | 2 | ELECTRIC MOTOR PREPARATION |
| 200101 | ELECTRIC MOTOR | EACH TIME | CHECK | 2 | OPERATION STATE CHECK |
| 200102 | ELECTRIC MOTOR | EACH TIME | CHECK | 2 | ABNORMAL SOUND CHECK |
| 200103 | ELECTRIC MOTOR | 1Y | MEASURE | 2 | BRAKE GAP MEASUREMENT |
| 200104 | ELECTRIC MOTOR | 2Y | OIL | 2 | BEARING PART OILING |
| 200900 | ELECTRIC MOTOR | EACH TIME | RESTORE | 9 | ELECTRIC MOTOR RESTORATION |
| ⋮ | | | | | |

| No | COUNT | NAME |
|---|---|---|
| 1 | 1 | MACHINE ROOM |
| 2 | 10 | OPERATING PANEL |
| 3 | 1 | MAIN OPENING/CLOSING MECHANISM |
| 4 | 10 | AUXILIARY OPENING/CLOSING MECHANISM |
| 5 | 1 | CONTROL PANEL |
| 6 | 1 | LOW-SPEED OPERATING STATE |
| 7 | 1 | ELECTRIC MOTOR |
| 8 | 1 | HIGH-SPEED OPERATING STATE |

Ba2, Bb2, Bc2, Bd2, Be2, Bf2, Bg2, Bh2

| ID | PRIORITY | NAME |
|---|---|---|
| 100000 | 2 | CONTROL PANEL PREPARATION |
| 100101 | 2 | STARTUP COUNT CHECK |
| 100102 | 1 | CONTROL PANEL CLEANING |
| 100103 | 2 | DRIVING VOLTAGE MEASUREMENT |
| 100104 | 2 | CONTROL VOLTAGE MEASUREMENT |
| 100900 | 9 | CONTROL PANEL RESTORATION |

Pe1, Ie1, Re1, Ie2, Ie3, Re2

| ID | PRIORITY | NAME |
|---|---|---|
| 200000 | 2 | ELECTRIC MOTOR PREPARATION |
| 200101 | 2 | OPERATION STATE CHECK |
| 200102 | 2 | ABNORMAL SOUND CHECK |
| 200900 | 9 | ELECTRIC MOTOR RESTORATION |

| VOICE CONTROL COMMAND | FUNCTION |
|---|---|
| AGAIN | READ ALOUD PROCEDURE CONTENT AGAIN |
| INPUT CANDIDATE | READ ALOUD ALL CANDIDATES OF VOICE INPUT |
| NEXT ITEM | PROCEED TO NEXT PROCEDURE |
| PREVIOUS ITEM | RETURN TO PROCEDURE ONE PREVIOUS |
| END BLOCK | END BLOCK SCENARIO BEING PERFORMED |
| END REPEAT | END REPEATING INSPECTION WORK BEING PERFORMED |
| END INSPECTION | PROCEED TO FINAL PROCEDURE |

FIG. 11

INSPECTION SUPPORT SYSTEM

CROSS-REFERENCE TO RELATED APPLICATIONS

This application is based upon and claims the benefit of priority from Japanese Patent Application No. 2018-232682, filed on Dec. 12, 2018; the entire contents of which are incorporated herein by reference.

FIELD

Embodiments described herein relate generally to an inspection support system.

BACKGROUND

In the inspection work of equipment, it is desirable to prevent skipped procedures and increase the quality of the work. For example, by improving the quality of the inspection work, it is possible to improve the safety of the equipment, prevent malfunctions of the equipment, or prevent faults of the equipment.

DETAILED DESCRIPTION

According to one embodiment, an inspection support system includes a terminal device, a memory device, and a processing device. The terminal device is auxiliary to a worker inspecting an equipment, and is configured to input and output information. The memory device stores a main scenario of inspection work. The main scenario includes a plurality of block scenarios. The plurality of block scenarios each includes preparation procedure content, inspection item content, and restoration procedure content. The preparation procedure content is of a preparation procedure up to performing the inspection work. The inspection item content is of an inspection item. The restoration procedure content is of a restoration procedure after performing the inspection work. The processing device refers to the memory device and transmits instruction information to the terminal device. The instruction information corresponds to at least one of the preparation procedure content, the inspection item content, or the restoration procedure content. The terminal device outputs the instruction information transmitted from the processing device and transmits response information to the processing device. The response information includes a response to the instruction information input by the worker. Based on the transmitted instruction information and the received response information, and according to the main scenario, the processing device transmits other instruction information to the terminal device.

Various embodiments are described below with reference to the accompanying drawings.

In the specification and drawings, components similar to those described previously or illustrated in an antecedent drawing are marked with like reference numerals, and a detailed description is omitted as appropriate.

Figure 1:
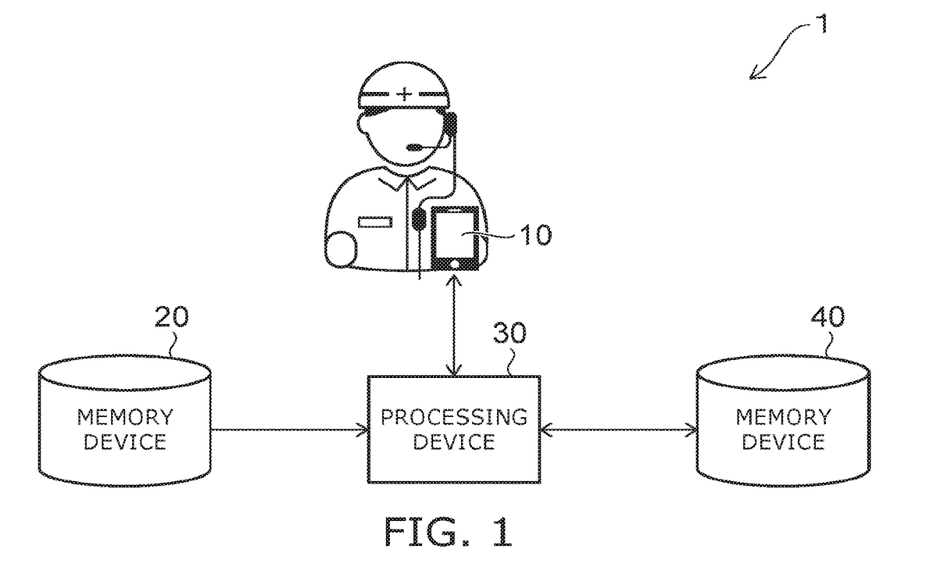
FIG. 1 is a block diagram illustrating the configuration of an inspection support system according to an embodiment.

FIG. 1 is a block diagram illustrating the configuration of an inspection support system according to an embodiment.

As illustrated in FIG. 1, the inspection support system 1 includes a terminal device 10, a memory device 20, and a processing device 30.

The terminal device 10 is auxiliary to a worker inspecting equipment. The terminal device 10 is configured to input and output information. For example, the terminal device 10 is a device including a communication function such as a PDA (Personal Digital Assistance), a PC (Personal Computer), a mobile telephone, a smartphone, a tablet, etc.

The terminal device 10 includes an outputter for outputting the information, and an inputter for the worker to input the information. For example, the outputter includes at least one of a monitor or a speaker (an audio output). The inputter includes at least one of a key (a button), a touchpad, or a microphone (a voice input). The terminal device 10 may include a touch panel functioning as both the inputter and the outputter.

Figure 2:
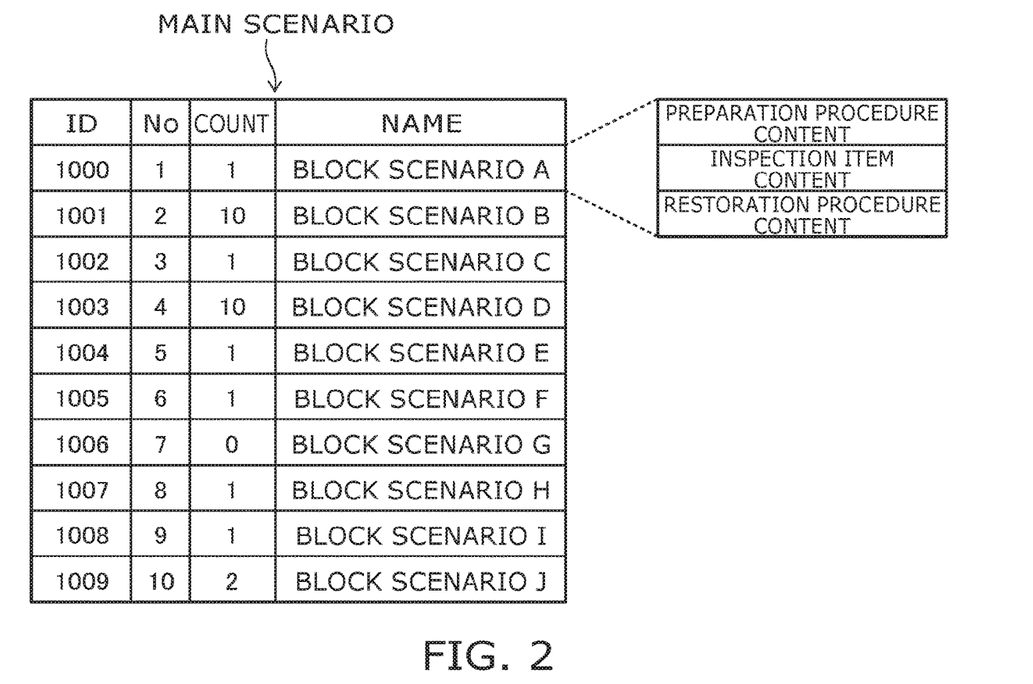
FIG. 2 is a schematic view illustrating a main scenario stored in memory.

FIG. 2 is a schematic view illustrating a main scenario stored in memory.

The memory device 20 stores a main scenario of inspection work such as that illustrated in FIG. 2. The main scenario includes multiple block scenarios. Each block scenario includes preparation procedure content, inspection item content, and restoration procedure content. The inspection item content is of inspection items including the content of the inspection work and the procedure of the inspection work. The preparation procedure content is of the preparation procedure up to performing the inspection work. The restoration procedure content is of the restoration procedure after performing the inspection work.

As illustrated in FIG. 2, the implementation count of each block content is set in the main scenario. When the implementation count is set to two or more, the content of the block content is repeated the set number of times. Also, as illustrated in FIG. 2, identification information (ID), a sequence number (No), etc., may be set for identifying the block content in the main scenario.

One block scenario may include multiple preparation procedure content. Also, one block scenario may include multiple inspection item content. One block scenario may include multiple restoration procedure content.

When one block scenario includes multiple preparation procedure content and multiple inspection item content, a part of the multiple preparation procedure content may be set between a part of the multiple inspection item content and another part of the multiple inspection item content. In other words, it is sufficient for at least one preparation procedure content to be set to be before the multiple inspection item content.

Similarly, when one block scenario includes multiple restoration procedure content and multiple inspection item content, a part of the multiple restoration procedure content may be set between a part of the multiple inspection item content and another part of the multiple inspection item content. In other words, it is sufficient for at least one restoration procedure content to be set to after the multiple inspection item content.

According to the main scenario, the processing device 30 accesses the memory device 20 and refers to the main scenario. The processing device 30 transmits, to the terminal device 10, instruction information corresponding to the preparation procedure content, the inspection item content, or the restoration procedure content. When receiving the instruction information, the terminal device 10 outputs the instruction information to the worker. Also, the terminal device 10 accepts a response to the instruction information input by the worker. The terminal device 10 transmits the response information including the response to the processing device 30.

The processing device 30 transmits, to the terminal device 10, other instruction information according to the main scenario based on the transmitted instruction information and the received response information. For example, the processing device 30 transmits, to the terminal device 10, instruction information corresponding to the preparation procedure content of a block scenario A illustrated in FIG. 2. The worker transmits, from the terminal device 10 to the processing device 30, response information indicating that the preparation procedure is completed based on the instruction information. Based on the instruction information and the response information, the processing device 30 determines that the preparation procedure content is completed. Then, the processing device 30 transmits, to the terminal device 10, other instruction information corresponding to the inspection item content.

The processing device 30 sequentially transmits, to the terminal device 10, the instruction information corresponding to the preparation procedure content, the inspection item content, and the restoration procedure content included in the one block scenario. The processing device 30 determines that the block scenario is completed when receiving the response information including the response to each instruction information.

According to the main scenario, the processing device 30 sequentially transmits, to the terminal device 10, instruction information corresponding to all of the block scenarios. When receiving the response information including the response to each instruction information, the processing device 30 determines that all of the block scenarios are completed and the inspection work of the main scenario is completed.

For example, the main scenario that is referred to by the processing device 30 is designated by the terminal device 10. Or, the processing device 30 may be configured to refer to a designated main scenario at a prescribed time and date based on a premade schedule, etc.

The processing device 30 may transmit a notification to the terminal device 10 upon at least one of the start time of the main scenario, the start time of each block scenario, the completion time of each block scenario, or the end time of the main scenario. The notification indicates that the main scenario or the block scenario has started or been completed.

The inspection support system 1 may include a memory device 40 as illustrated in FIG. 1. The memory device 40 stores the results of the inspection work. For example, response information that includes the inspection results is transmitted from the terminal device 10 to the processing device 30. The processing device 30 stores information of the inspection results in the memory device 40. The processing device 30 may refer to previous inspection results and transmit the previous inspection results to the terminal device 10.

For example, when one block scenario is completed, the processing device 30 stores, in the memory device 40, information of the inspection results of the one block scenario. Or, when the main scenario is completed, the processing device 30 may store, collectively in the memory device 40, information of the inspection results of each block scenario included in the main scenario.

The memory devices 20 and 40 include, for example, at least one of a hard disk drive, a network hard disk, or flash memory. One memory device may function as the memory devices 20 and 40. The processing device 30 includes, for example, a central processing unit including a processing circuit. For example, the processing device 30 is connected to the memory devices 20 and 40 by a wired or wireless technique. The processing device 30 may be connected to the memory devices 20 and 40 via a network. The memory device 20, the processing device 30, and the memory device 40 may be included in one device (e.g., a PC).

For example, the main scenario and the block scenarios are written in a spreadsheet, a CSV (Comma-Separated Values) file, an XML (Extensible Markup Language) file, etc. The processing device 30 reads the file in which the main scenario and the block scenarios are written and performs the processing described above.

Effects of the embodiment will now be described.

To prevent skipping in the inspection work and to improve the quality, it is desirable to generate information (e.g., a work manual) showing the specific procedures of the inspection work. However, even for the same equipment, there are cases where the content of the inspection work of the equipment is different between customers. Also, even for the equipment of one customer, there are cases where additional inspection work must be performed at a designated interval. An enormous amount of time is necessary to make work manuals of the inspection work for each interval according to the conditions of each customer. Also, there is a possibility that mistakes undesirably may be included in the work manuals when making many work manuals.

According to the inspection support system 1 according to the embodiment, the main scenario of the inspection work includes multiple block scenarios. In each block scenario, the specific content of the inspection work is grouped in one inspection item content. The main scenario can be made by adding, deleting, or interchanging the block scenarios. Accordingly, the time that is necessary to make the work manual can be greatly shortened. The main scenario that is generated is read by the processing device 30; and the instruction information is transmitted to the terminal device 10 according to the main scenario.

Also, it is desirable to write the preparation procedure and the restoration procedure accompanying the inspection work in the work manual. By clarifying these procedures, the quality of the work accompanying the inspection work can be increased. However, an enormous amount of time is necessary if the preparation procedure and the restoration procedure corresponding to each inspection item content are written for each main scenario. Therefore, in the inspection support system 1 according to the embodiment, each block scenario further includes the preparation procedure content and the restoration procedure content. By including these procedure content in the block scenario, these procedures are added, deleted, or interchanged simultaneously when adding, deleting, or interchanging the block scenario. Accordingly, it is unnecessary to write the preparation procedure and the restoration procedure accompanying the inspection work for each inspection item content. Because these procedures are read by the processing device 30 and the instruction information is transmitted to the terminal device 10, skipped procedures can be prevented; and the quality of the work can be increased.

The inspection support system 1 according to the embodiment will now be described more specifically.

Figure 3A:
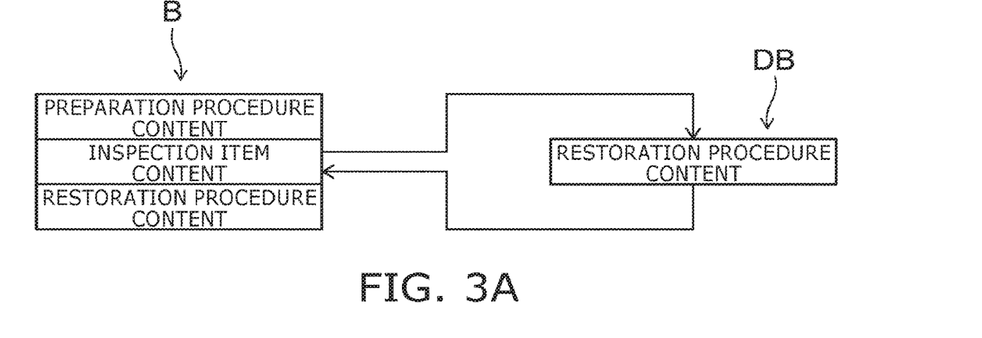
FIGS. 3A and 3B are schematic views illustrating a block scenario stored in memory.
Figure 3B:
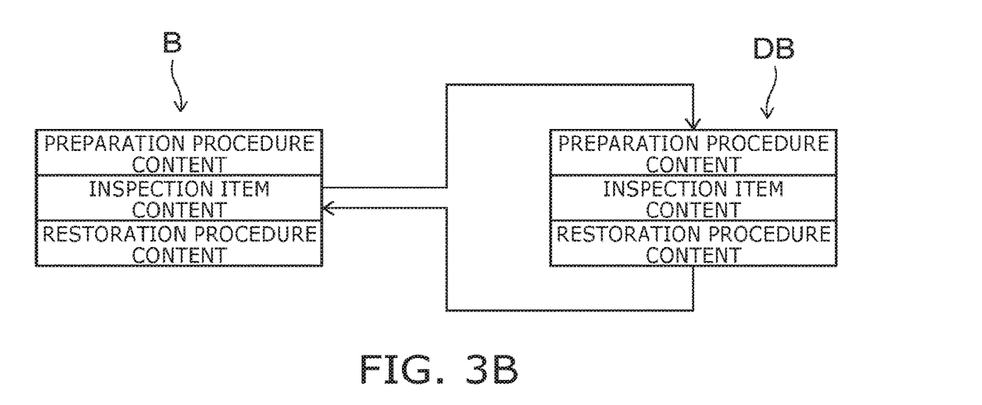
Figure 4:
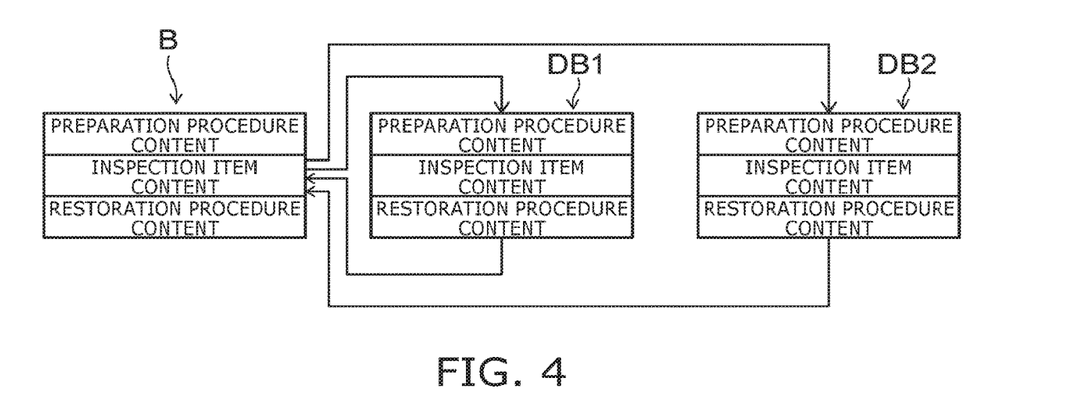
FIG. 4 is a schematic view illustrating a block scenario stored in memory.

FIG. 3A to FIG. 4 are schematic views illustrating a block scenario stored in memory.

As illustrated in FIG. 3A and FIG. 3B, a transition to a subordinate block scenario DB may be set in a block scenario B. The subordinate block scenario DB includes at least restoration procedure content.

For example, as illustrated in FIG. 3A, the subordinate block scenario DB includes only restoration procedure content. Or, as illustrated in FIG. 3B, the subordinate block scenario DB may include preparation procedure content, inspection item content, and restoration procedure content. Any block scenario B included in the main scenario may be designated as the subordinate block scenario DB that is the transition destination.

For example, the subordinate block scenario DB is for inspection work or a procedure arising additionally according to the inspection results. Because the subordinate block scenario DB includes at least restoration procedure content, skipped procedures can be prevented and the quality of the work can be increased for the additional work or inspection work as well.

A condition for the transition to the subordinate block scenario may be preset. For example, after the processing device 30 transmits instruction information corresponding to the inspection item content of a block scenario, the worker inputs response information including the inspection results to the terminal device 10. The processing device 30 compares the response information for the block scenario to a prescribed condition and determines whether or not to transition to the subordinate block scenario.

For example, for one inspection item content, the worker is requested to input a measured value. The worker transmits, to the processing device 30, response information including the measured value as the response to the instruction information corresponding to the inspection item content. The processing device 30 compares the measured value to a prescribed numerical range. For example, if the measured value is within the prescribed numerical range, the processing device 30 does not transition to the subordinate block scenario. If the measured value is outside the prescribed numerical range, the processing device 30 transitions to the subordinate block scenario as illustrated in FIG. 3A or FIG. 3B.

Transitions may be set to multiple subordinate block scenarios from the block scenario included in the main scenario. For example, the block scenario B transitions to a subordinate block scenario DB1 (a first subordinate block scenario) when a condition (a first condition) is satisfied as illustrated in FIG. 4. The block scenario B transitions to a subordinate block scenario DB2 (a second subordinate block scenario) when another condition (a second condition) is satisfied.

In the example recited above, the processing device 30 compares the measured value to the prescribed numerical range. For example, if the measured value is within the prescribed numerical range, the processing device 30 transitions to the subordinate block scenario DB1. If the measured value is outside the prescribed numerical range, the processing device 30 transitions to the subordinate block scenario DB2.

Thus, the content of the main scenario can be concise by setting a transition from the block scenario included in the main scenario to a subordinate block scenario other than the main scenario. For example, in the case where a designated procedure and a designated inspection item are to be repeated, the procedure and the inspection item are set as a subordinate block scenario; and transitions to the subordinate block scenario from one or more block scenarios are set. Thereby, long main scenarios can be suppressed; and it is easy to generate the main scenarios. Also, mistakes due to repeatedly writing the designated procedure and the designated inspection item can be prevented.

After transitioning to the subordinate block scenario and completing the subordinate block scenario, the flow returns to the original block scenario as illustrated in FIG. 3A, FIG. 3B, and FIG. 4. By returning to the original block scenario, a skipped procedure of the original block scenario can be prevented.

The processing device 30 may check for transitions from the block scenarios to subordinate block scenarios when reading the main scenario. For example, the processing device 30 confirms that the block scenario at the origin of the transition is not designated as the subordinate block scenario at the destination of the transition. In other words, the processing device 30 confirms that the block scenario is not set as its own transition destination.

If the block scenario is set as its own transition destination, the block scenario cannot be completed. For example, the processing device 30 emits a notification when finding such a setting. The processing device 30 may transmit the notification to the terminal device 10 or may transmit the notification to a terminal device or a PC of a manager of the inspection work. Due to the notification, it can be known that there is an irregularity in the main scenario.

Example

Figure 5:
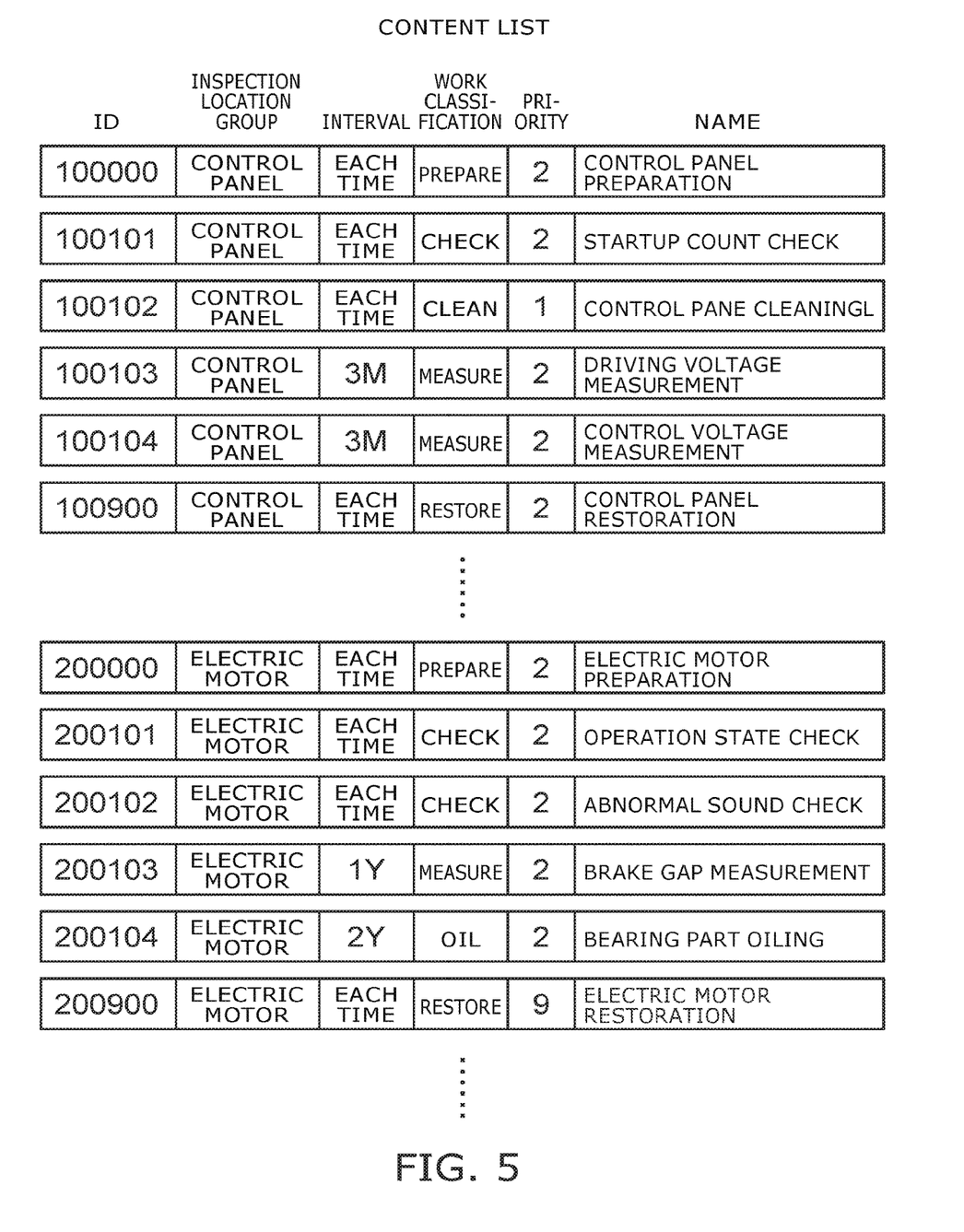
FIG. 5 is a schematic view illustrating a list of the preparation procedure content, the inspection item content, and the restoration procedure content.

FIG. 5 is a schematic view illustrating a list of the preparation procedure content, the inspection item content, and the restoration procedure content.

Figure 6:
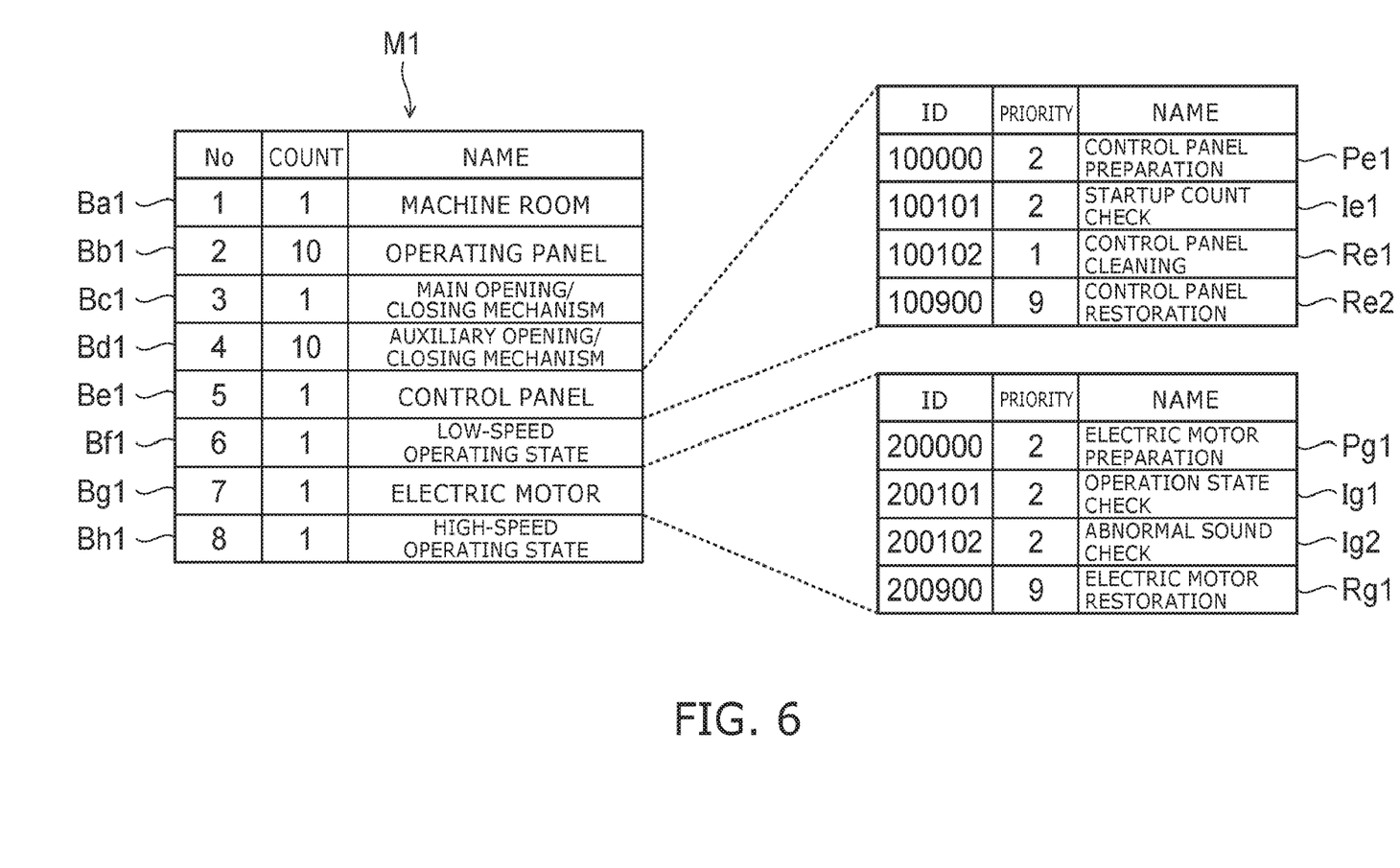
FIG. 6 is a schematic view illustrating an example of a main scenario.
Figure 7:
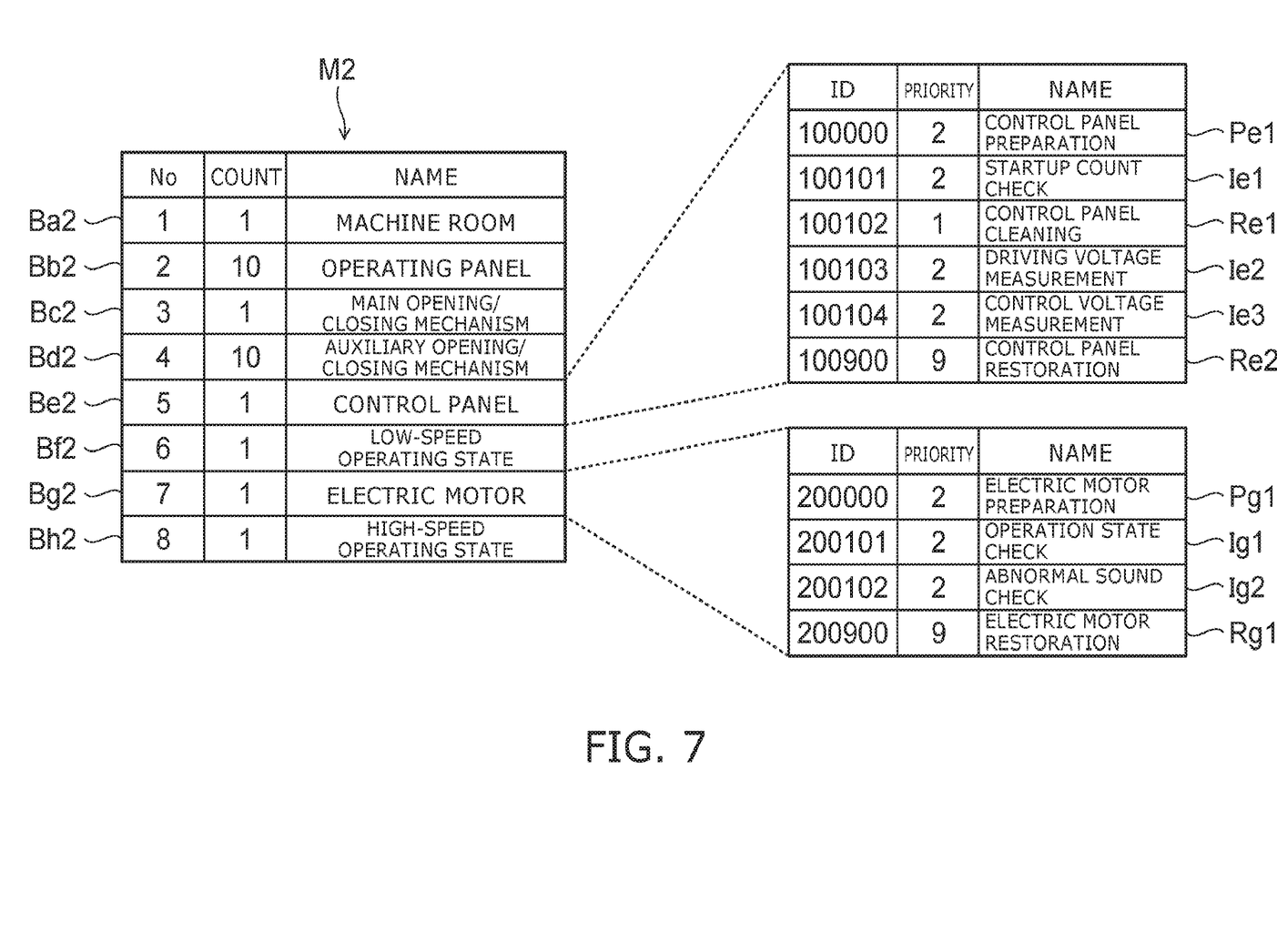
FIG. 7 is a schematic view illustrating an example of a main scenario.
Figure 8:
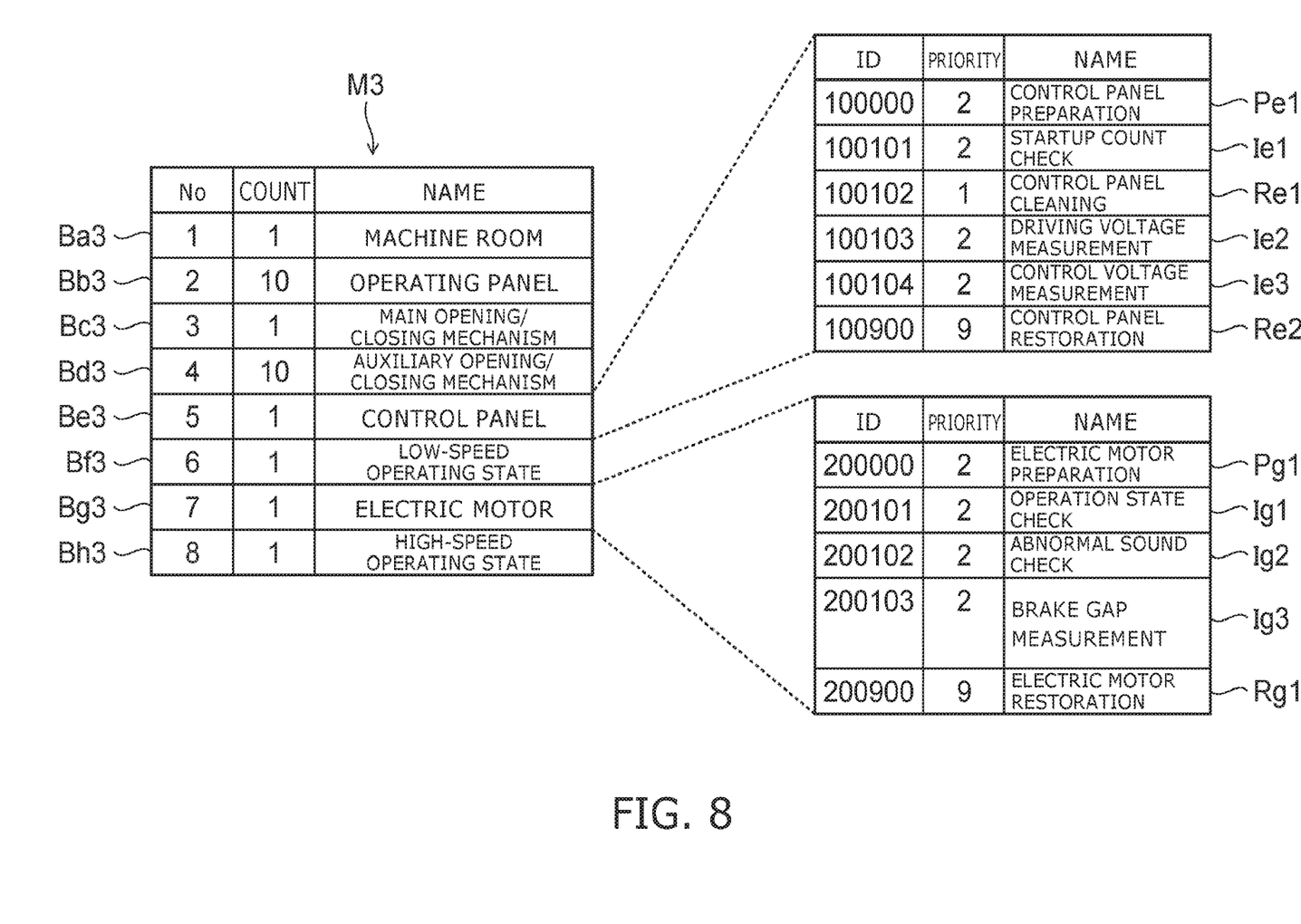
FIG. 8 is a schematic view illustrating an example of a main scenario.

FIG. 6 to FIG. 8 are schematic views illustrating examples of main scenarios.

FIG. 5 illustrates a list of content relating to the inspection work of machinery. The preparation procedure content, the inspection item content, and the restoration procedure content are included in the list. For example, the ID, the inspection location group, the interval, the work classification, the priority, and the name are set in each content.

For example, as illustrated in FIG. 5, pre-generated preparation procedure content, inspection item content, and restoration procedure content are stored in the memory device 20. The user generates the main scenario while appropriately referring to the content stored in the memory device 20. In FIG. 5, all of the preparation procedure content, the inspection item content, and the restoration procedure content is included in one list. Instead of such a format, the preparation procedure content, the inspection item content, and the restoration procedure content respectively may be collected in multiple lists.

FIG. 6 to FIG. 8 illustrate main scenarios of the inspection work of machinery (e.g., an elevator) using the content illustrated in FIG. 5. For example, the inspection work of the machinery is performed monthly. Also, in the inspection work of the machinery, additional inspection work is performed tri-monthly and yearly. A main scenario M1 of FIG. 6 shows the inspection work performed monthly. A main scenario M2 of FIG. 7 shows the inspection work performed tri-monthly. A main scenario M3 of FIG. 8 shows the inspection work performed yearly.

In the examples of FIG. 6 to FIG. 8, the main scenario M1 includes block scenarios Ba1 to Bh1. The main scenario M2 includes block scenarios Ba2 to Bh2. The main scenario M3 includes block scenarios Ba3 to Bh3. For example, the names of the block scenarios are common. However, the content included in the block scenarios is different between the main scenarios.

For example, preparation procedure content Pe1, inspection item content Ie1, and restoration procedure content Re1 and Re2 are included in the block scenario Be1 of the main scenario M1 of FIG. 6. Inspection item content Ie2 and Ie3 are further included in the block scenario Be2 of the main scenario M2 of FIG. 7 and the block scenario Be3 of the main scenario M3 of FIG. 8. The content of the block scenarios Be2 and Be3 is different from the content of the block scenario Be1.

Preparation procedure content Pg1, inspection item content Ig1 and Ig2, and restoration procedure content Rg1 are included in the block scenario Bg1 of the main scenario M1 and the block scenario Bg2 of the main scenario M2. Inspection item content Ig3 is further included in the block scenario Bg3 of the main scenario M3. The content of the block scenarios Bg2 and Bg3 is different from the content of the block scenario Bg1.

Thus, the content of the inspection work changes at designated intervals. For example, the block scenario that corresponds to each inspection work is generated. The main scenario of the tri-monthly inspection work can be generated by replacing the block scenarios of a part of the main scenario of the monthly inspection work with block scenarios corresponding to the tri-monthly inspection work. When interchanging the block scenarios, the preparation procedure content and the restoration procedure content also are modified together. Therefore, it is possible to generate the main scenario easily, prevent skipped procedures, and increase the quality of the work.

In the example illustrated in FIG. 5 to FIG. 8, a priority is set for each content. For example, the work time that is allotted to the inspection work is set for each main scenario. Or, the start time and the end time of the main scenario may be set for the work time. The processing device 30 determines the work time based on the start time and the end time. The processing device 30 measures the elapsed time from the work start of the inspection work. The processing device 30 may omit one of the preparation procedure content, the inspection item content, or the restoration procedure content based on the work time, the elapsed time, and the priority.

For example, the processing device 30 subtracts the elapsed time from the work time. The processing device 30 uses the calculated time as the remaining time for the inspection work. When transmitting the instruction information according to the main scenario, the processing device 30 refers to the remaining time and the amount of the uncompleted content. When the amount of the incomplete content with respect to the remaining time is high, the processing device 30 may omit content having low priorities.

The priority may be a binary setting such as "0" or "1," etc. Or, the priority may be set using three or more numerical values. In such a case, the omitting is performed from the content that has lower priorities. The content that has the maximum value set as the priority may be set not to be omitted regardless of the remaining time. Thereby, the omission of important content greatly affecting the safety, etc., can be prevented. Or, regardless of the priority, at least the restoration procedure content may be set not to be omitted. This is because the restoration procedure content is the procedure of restoring the inspected location to the original state, and may greatly affect the safety, etc.

For example, the standard time necessary for completion is preset for each content. The processing device 30 compares the remaining time and the total of the standard time (the total standard time) of the incomplete content. For example, when the total standard time is longer than the remaining time and the proportion of the difference between the total standard time and the remaining time to the remaining time exceeds a threshold, the processing device 30 omits content having low priorities. Multiple thresholds are set in the case where the priority is set using three or more numerical values. Content that has higher priorities is omitted as the proportion exceeds larger thresholds.

Or, the average time that is necessary for completing one content may be preset. For example, the processing device 30 calculates the total average time by multiplying the average time by the number of incomplete content. When the total average time is longer than the remaining time and the proportion of the difference between the total average time and the remaining time to the remaining time exceeds a threshold, the processing device 30 omits content having low priorities. Multiple thresholds are set in the case where the priority is set using three or more numerical values. Content that has higher priorities is omitted as the proportion exceeds larger thresholds.

Figure 9:
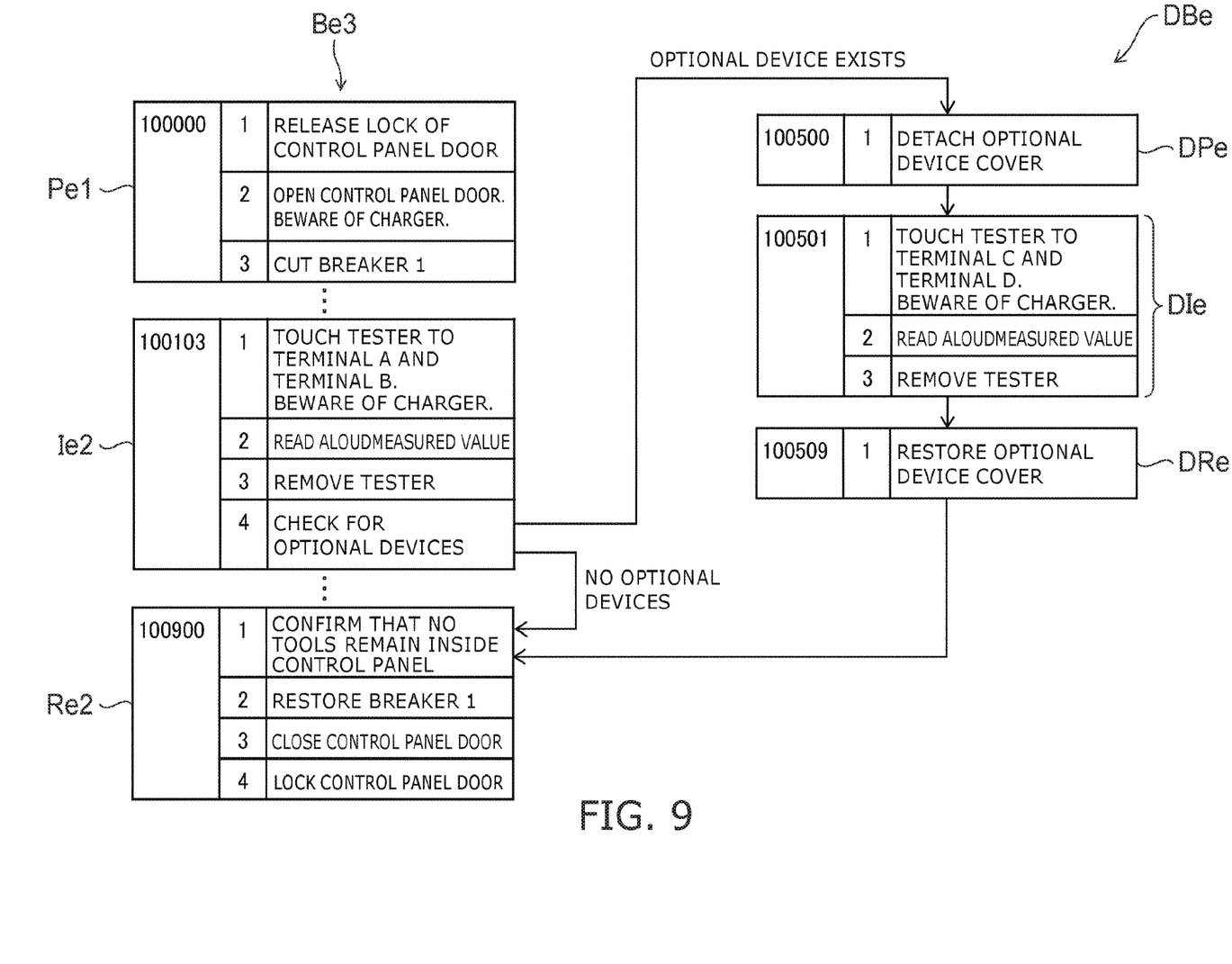
FIG. 9 is a schematic view illustrating an example of a block scenario.

FIG. 9 is a schematic view illustrating an example of a block scenario.

Figure 10:
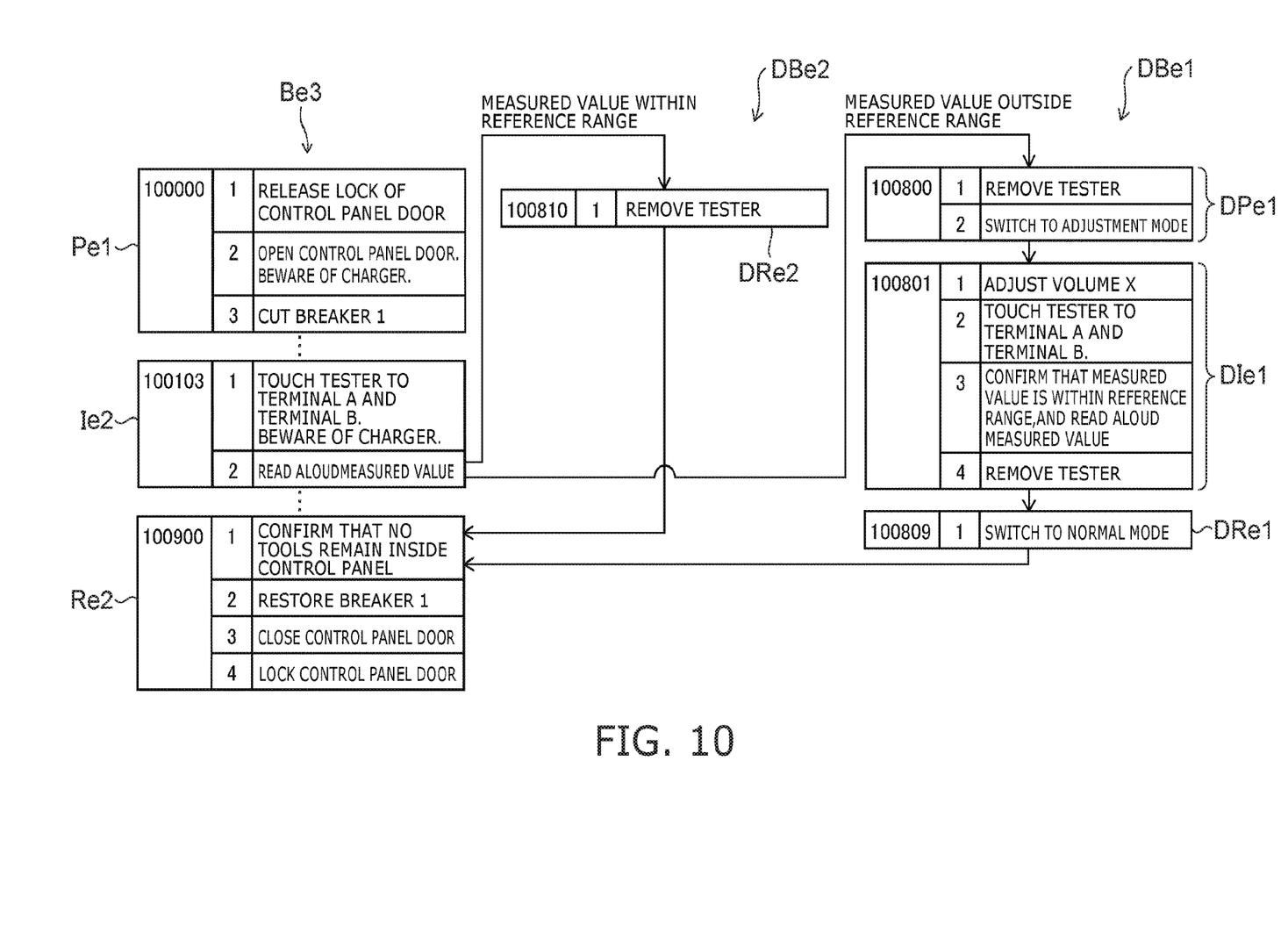
FIG. 10 is a schematic view illustrating another example of the block scenario.

FIG. 10 is a schematic view illustrating another example of the block scenario.

FIG. 9 and FIG. 10 illustrate a part of the block scenario Be3 illustrated in FIG. 8.

As illustrated in FIG. 9 and FIG. 10, the preparation procedure content, the inspection item content, and the restoration procedure content of the block scenario include specific procedures.

For example, a voice that indicates a specific procedure included in each content is output from the terminal device 10. When the procedure indicated by the voice is completed, the worker inputs, to the terminal device 10, a voice (e.g., "OK," etc.) indicating the completion. Or, the worker inputs a voice to the terminal device 10 as a response (e.g., a measured value) to an instruction indicated by the voice.

FIG. 9 illustrates an example of transitioning from the block scenario Be3 to a subordinate block scenario. In the example of FIG. 9, the worker is requested to check for optional devices in the inspection item content Ie2 of the block scenario Be3. When confirming that there are no optional devices, the worker inputs such information to the terminal device 10. The processing device 30 receives the response information and proceeds to the restoration procedure content Re2. Or, when confirming that an optional device exists, the worker inputs such information to the terminal device 10. The processing device 30 receives the response information and transitions from the block scenario Be3 to a subordinate block scenario DBe. In other words, a condition is set in the block scenario Be3 so that the subordinate block scenario DBe is transitioned to when an optional device exists.

The subordinate block scenario DBe includes preparation procedure content DPe, inspection item content DIe, and restoration procedure content DRe. The processing device 30 sequentially transmits, to the terminal device 10, instruction information corresponding to each content of the subordinate block scenario DBe. The processing device 30 proceeds to the restoration procedure content Re2 when the subordinate block scenario DBe is completed.

FIG. 10 illustrates another example of transitioning from the block scenario Be3 to subordinate block scenarios. In the example of FIG. 10, the worker is requested to read aloud a measured value in the inspection item content Ie2 of the block scenario Be3. When reading aloud the measured value, the worker inputs the information to the terminal device 10. The processing device 30 compares the measured value to a preset reference range.

When the measured value is outside the reference range, the processing device 30 transitions from the block scenario Be3 to a subordinate block scenario DBe1. The subordinate block scenario DBe1 includes preparation procedure content DPe1, inspection item content DIe1, and restoration procedure content DRe1. The processing device 30 sequentially transmits, to the terminal device 10, instruction information corresponding to each content of the subordinate block scenario DBe1. The processing device 30 proceeds to the restoration procedure content Re2 when the subordinate block scenario DBe1 is completed.

When the measured value is within the reference range, the processing device 30 transitions from the block scenario Be3 to a subordinate block scenario DBe2. The subordinate block scenario DBe2 includes only restoration procedure content DRe2. The processing device 30 transmits instruction information corresponding to the restoration procedure content DRe2 to the terminal device 10. The processing device 30 proceeds to the restoration procedure content Re2 when the subordinate block scenario DBe2 is completed.

It is desirable for information to be imputable to the terminal device 10 by a voice. Also, it is desirable for information to be output from the terminal device 10 by a voice. Thereby, it is possible for the worker to input information to the terminal device 10 and receive the instruction information while performing the inspection work.

Figure 11:
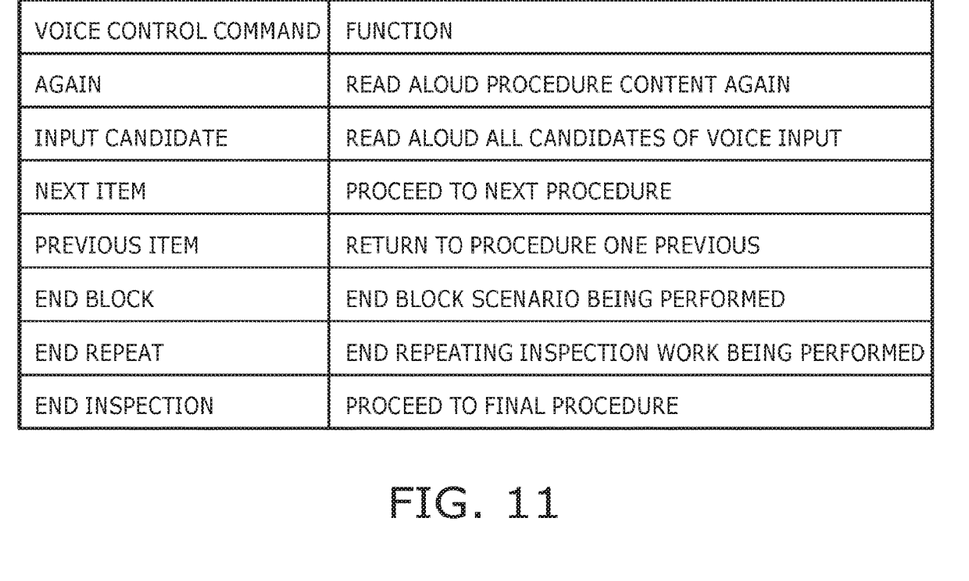
FIG. 11 is a table illustrating an example of voice commands.

FIG. 11 is a table illustrating an example of voice commands.

When the words shown at the left side of the table of FIG. 11 are spoken toward the terminal device 10, information is input to the terminal device 10 by the voice. The processing device 30 identifies a command included in the voice information and performs processing corresponding to the command.

For example, there are cases where several choices are set as inspection item content requesting an inspection result from the worker. The worker selects one of the choices as the inspection result. Using the voice command of "input candidate," the terminal device 10 outputs the choices by a voice. The choices to be input can be checked thereby.

Using the voice command of "block end," the block scenario that is being performed is ended; and the flow moves to the next block scenario. When a subordinate block scenario is being performed, the flow returns to the original block scenario. Or, for safety, etc., when the voice command of "block end" is input, the preparation procedure content and the inspection item content may be ended; and only the restoration procedure content may be performed.

The processing of the various data recited above may be recorded in a magnetic disk (a flexible disk, a hard disk, etc.), an optical disk (CD-ROM, CD-R, CD-RW, DVD-ROM, DVD±R, DVD±RW, etc.), semiconductor memory, or another recording medium as a program that can be executed by a computer.

For example, the data that is recorded in the recording medium can be read by a computer (or an embedded system). The recording format (the storage format) of the recording medium is arbitrary. For example, the computer reads the program from the recording medium and causes a CPU to execute the instructions recited in the program based on the program. The computer may acquire (or read) the program via a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An inspection support system, comprising:
a terminal device auxiliary to a worker inspecting an equipment, the terminal device being configured to input and output information;
a memory device storing a main scenario of inspection work, the main scenario including a plurality of block scenarios, the plurality of block scenarios each including preparation procedure content, inspection item content, and restoration procedure content, the preparation procedure content being of a preparation procedure up to performing the inspection work, the inspection item content being of an inspection item, the restoration procedure content being of a restoration procedure after performing the inspection work; and
a processing device referring to the memory device and transmitting instruction information to the terminal device, the instruction information corresponding to at least one of the preparation procedure content, the inspection item content, or the restoration procedure content,
the terminal device outputting the instruction information transmitted from the processing device and transmitting response information to the processing device, the response information including a response to the instruction information input by the worker,
based on the transmitted instruction information and the received response information, and according to the main scenario, the processing device transmitting other instruction information to the terminal device,
wherein the terminal device is configured to receive and accept the input of the response information by a voice,
the processing device is configured to process the response information received via the voice, identify a command included in the response information input by the voice, and perform processing corresponding to the command,
in one of the plurality of block scenarios, the instruction information requests to input a measured value,
the processing device decides to transition to the first subordinate block scenario when the measured value is outside a preset range, and the processing device decides to transition to the second subordinate block scenario when the measured value is inside the preset range, wherein a first transition to the first subordinate block scenario and a second transition to the second subordinate block scenario are set for the one of the plurality of block scenarios, the first subordinate block scenario includes a first preparation procedure content, a first inspection item content, and a first restoration procedure content, the second subordinate block scenario includes a second preparation procedure content, a second inspection item content, and a second restoration procedure content, and the processing device returns to the one of the plurality of block scenarios when the first subordinate block scenario or the second subordinate block scenario is completed.

2. The system according to claim 1, wherein according to the main scenario, the processing device sequentially transmits, to the terminal device, the instruction information corresponding to the preparation procedure content, the inspection item content, and the restoration procedure content included in each of the plurality of block scenarios, and the processing device determines that the inspection work is completed when all of the plurality of block scenarios are completed.

3. The system according to claim 1, wherein priorities are set respectively for the preparation procedure content, the inspection item content, and the restoration procedure content, and the processing device omits one of the preparation procedure content, the inspection item content, or the restoration procedure content based on a work time set for the main scenario, an elapsed time of the inspection work, and the priorities.

4. The system according to claim 1, wherein the processing device emits a notification when a transition is set from the one of the block scenarios to the one of the block scenarios.

5. The system according to claim 1, wherein a memory device stores a file in which the main scenario and the plurality of block scenarios are written, and the processing device reads the file.

6. The system according to claim 5, wherein the main scenario and the plurality of block scenarios are written in a spreadsheet, a Comma-Separated Values file, or an Extensible Markup Language file.

7. The system according to claim 1, wherein a first condition for the first transition and a second condition for the second transition are set, and when the response information for the one of the block scenarios satisfies the first condition or the second condition, the processing device transmits, to the terminal device, the instruction information corresponding to the first restoration procedure content or the second restoration procedure content.

* * * * *